United States Patent Office 3,030,807
Patented Apr. 24, 1962

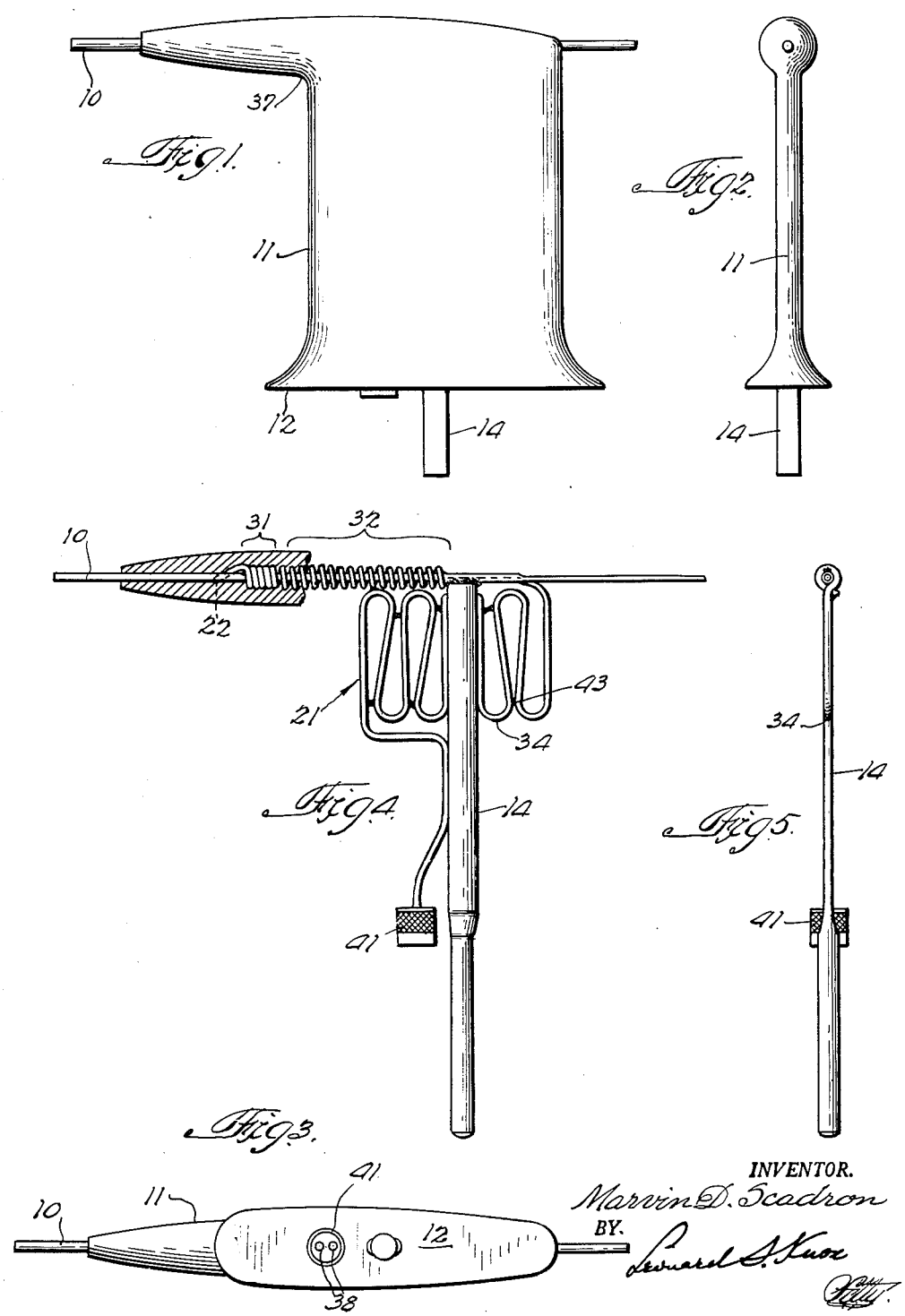
April 24, 1962 M. D. SCADRON 3,030,807
HEATED PITOT TUBE ASSEMBLY
Filed Nov. 19, 1959 3 Sheets-Sheet 1
INVENTOR.
Marvin D. Scadron

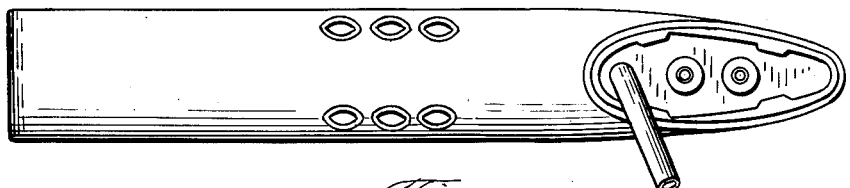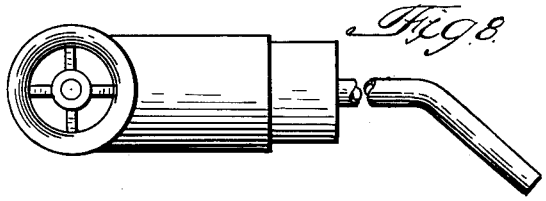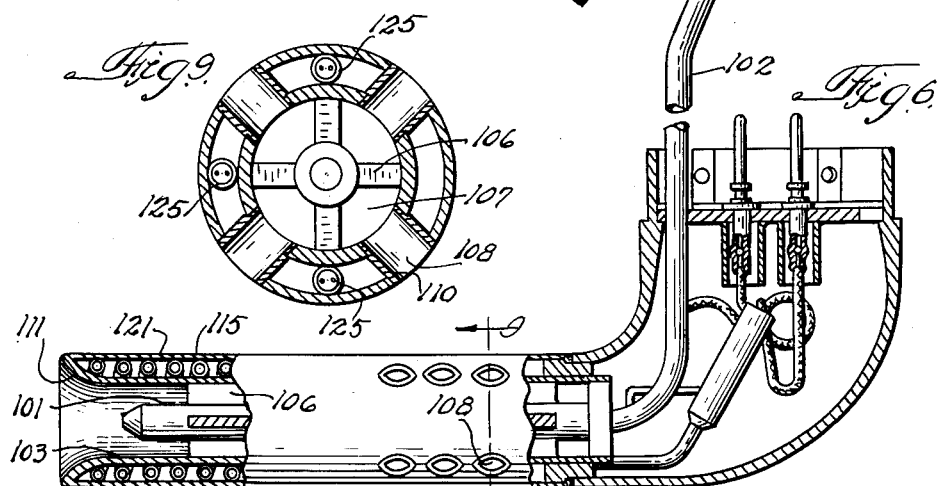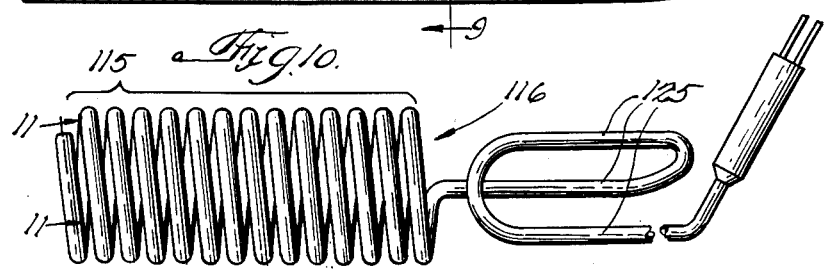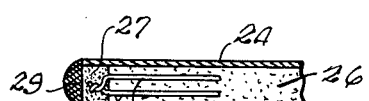

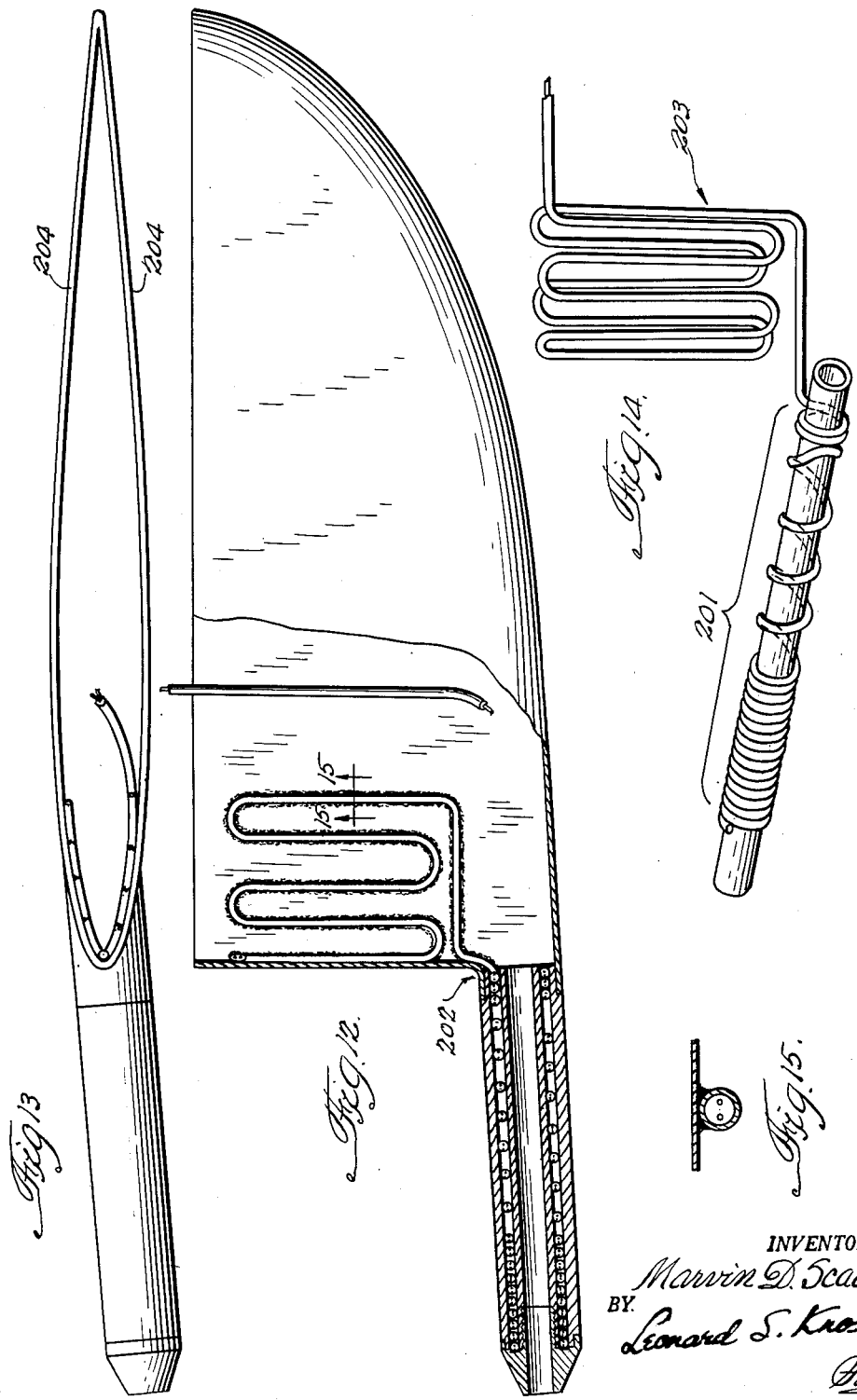

3,030,807
HEATED PITOT TUBE ASSEMBLY
Marvin D. Scadron, Skokie, Ill., assignor to Aero Research Instrument Co., Inc., Chicago, Ill.
Filed Nov. 19, 1959, Ser. No. 854,188
6 Claims. (Cl. 73—212)

This invention relates to Pitot tubes and like instrumentalities, as for example, a Pitot tube mounted exteriorly of the fuselage of an airplane, which are subject to icing during flight and to combat which heat must be applied to eliminate the well-known deleterious effects of icing.

With respect to Pitot tubes for aircraft the tube proper is spaced from and supported on the fuselage, for example, by a streamline bracket. Consequently icing of the bracket may create aerodynamic disturbances which so affect the flow of air past the tube as to produce erroneous indications of velocity. For similar reasons icing of the exterior of the tube proper is to be avoided and, moreover, icing within the tube may throttle flow to the point where erroneous or even no indication is available.

In attempts to solve this problem resort has been had to various heating expedients but none, to my knowledge, has provided a fully acceptable solution. My invention has for its principal object the provision of improved heating means to insure that all parts of the tube and support are maintained at a temperature calculated to neutralize icing effects, the heating means being so proportioned and arranged that those surfaces whereat ice formation are maximum are heated at a more rapid rate than those surfaces at which ice formation is a minimum whereby current consumption may be a minimum consistent with the planned load on the heating means.

Another object is to provide heating means for the purpose aforesaid arranged to occupy minimum space in order that the surfaces presented to the air stream are no greater or only slightly in excess of those which otherwise would be occupied by the Pitot tube and support per se.

A further object is to provide heating means as aforesaid which is incorporated with the Pitot tube and its bracket mounting the tube on its ultimate support, e.g. an airplane in a manner far more reliable than has hitherto been the practice whereby the same is not likely to be rendered inoperative by vibration of the aircraft.

An additional object is to provide an organization in accordance with the foregoing which utilizes a heating element of extremely small transverse cross section capable of being cut to any desired total length and then deformed into coils and convolutions of virtually any configuration dictated by the geometry of the parts to be heated.

Other objects and advantages of the invention will become evident from the ensuing description which, taken with the accompanying drawings, discloses certain modes in which the invention may be embodied in practice.

In these drawings:

FIG. 1 is a side elevation of a Pitot tube and its bracket embodying the invention;

FIG. 2 is a right hand end elevation thereof;

FIG. 3 is a bottom plan view thereof;

FIG. 4 is a detail, in side elevation of the heating means in its relation to the Pitot tube per se;

FIG. 5 is a side elevation thereof;

FIG. 6 is a side elevation and partial section of a modified form of the invention;

FIG. 7 is a top plan view thereof;

FIG. 8 is a left hand elevation of the device as seen in FIG. 7;

FIG. 9 is a cross section taken on the line 9—9 of FIG. 6;

FIG. 10 is a detail of the heating element incorporated in the device of FIG. 6, but slightly enlarged;

FIG. 11 is a cross section taken on the line 11—11 of FIG. 10;

FIG. 12 is a side elevation and partial section of another modification;

FIG. 13 is a top plan view thereof;

FIG. 14 is a detail in perspective of the bearing means thereof assembled with the Pitot tube; and FIG. 15 is a cross section taken on the line 15—15 of FIG. 12.

Broadly regarded, the invention comprises a Pitot tube which, in its fundamental structure, may follow any of several conventional forms, viz., adapted to measure the velocity head of a stream of air absolutely or by comparison with static head. Pitot tubes are used on aircraft for measuring the air speed and, for this purpose, are mounted on the skin of the aircraft. Consequently the device is subject to icing during flight and heating means are provided for overcoming this condition. In accordance with the present invention a Pitot tube and the bracket by which the same is carried on the aircraft are both heated. Icing of the bracket can introduce error in the reading since icing may become so severe as to cause aerodynamic disturbances about the entrance of the tube and consequent erroneous sensing of the air velocity. In respect to the tube per se icing may block the throat completely. Accordingly I provide heating means adapted to heat the tube and bracket which is so arranged to afford maximum heat transfer thereto in a proportional manner consistent with minimum current consumption. By uitlizing a slender, elongated heating element comprising a malleable, metallic sheath enclosing the conductor or conductors in an electrically-insulating matrix of compressed, pulverulent material, the element may be bent into virtually any configuration dictated by the particular application. This is to say, where icing is likely to be maximum the element may be concentrated in that region and vice versa. Moreover, in accordance with the invention, the heating element is sweated into intimate contact with the surface to be heated or may be tacked thereto, by brazing or hard soldering. In one of its aspects the invention contemplates certain features of construction for incorporating the element with the Pitot tube and its bracket whereby manufacturing cost is minimized.

Turning then to the drawings I have shown, as one embodiment, a Pitot tube 10 integrated with a bracket 11, as by casting metal about the tube, e.g. aluminum. The support has a face 12 which abuts the skin of the aircraft and is attached thereto by screws entering tapped holes (not shown). The side tube, i.e. that part which leads to the indicating instrument, is indicated at 14.

In the several embodiments herein illustrated and to be described the heating element comprises a tubular sheath of malleable or readily deformable metal capable of being bent to small arcs, e.g. to a radius substantially equal to the diameter of the sheath whereby the element may be coiled to embrace Pitot tubes of extremely small diameter. The sheath supports and protects a conductor or conductors of wire having high electrical resistivity, e.g. Nichrome. Internal support and spacing is obtained by compacting pulverulent material, e.g. magnesium oxide within the tube. The resultant element is capable of being bent through a small radius without the danger of short circuiting any of the internal conductors on their companions or the sheath.

Thus, as seen in FIG. 4, the heating element 21 is a continuous length of material, as described in the preceding paragraph, preferably including a pair of conductors. In order to bring out the terminal ends at one location that end of the element which is remote from the connecting terminals, namely, 22 is prepared as in FIG. 11 wherein the sheath 24 encloses a pair of wires 25 in a matrix 26. The matrix is extracted for a short distance from the end; the sheath is cut back to expose the ends of the wires which are twisted together and then preferably welded; insulation 27 is packed into the cavity and the end of the sheath is closed by hard solder, e.g. silver solder, as at 29.

Adjacent the exposed end of the Pitot tube 10 the element is coiled tightly thereabout in a close pitch, as at 31, which coiling continues to the side tube 14 in a coarser pitch, as at 32. Since icing is likely to be heaviest at the leading end of the tube the closer spacing of the coils at the region 31 provides a higher temperature than at the region 32 where the icing diminishes in concentration. The element is continued rearwardly and downwardly and is then looped in zig-zag fashion into a plurality of convolutions 34 to provide concentrated heating in that portion of the bracket adjacent the corner 37 where ice tends to accumulate more so than elsewhere, and the element is then returned to the side tube 14 to provide an anchor point, whereafter the same ends in terminals 38 enclosed in a socket 41 to receive the exterior connection from a source of current.

In order to rigidify the convolutions 34 pending the casting operation the same are tacked, as at 43, to each other and to the side tube 14. It will be noted that the innermost one of the group of turns 32 preferably continues parallel to the axis of the tube 10 and then downwardly to form the first of the convolutions 34, and that the left hand convolution may be tack-brazed or soldered to the turns 32.

An alternative embodiment of the invention is illustrated in FIGS. 6 to 10 wherein the Pitot tube and its bracket are fabricated from suitably formed sheet and tubular material.

The Pitot tube proper is shown at 101. It extends to the rear as shown and is terminated by a connecting portion 102. An outer tube 103 surrounds the tube 101, the spacing between the two being effected by partitions 106 defining a plurality of passages 107 which are in communication with radial outlet passages 108 defined by short tubes 110. It will be evident that, in this example, the air stream entering the throat 111 of the tube 103 is rendered comparatively non-turbulent before the velocity thereof is sensed by the Pitot tube 101, and that the excess volume of air not delivered through the termination 102 is by-passed through the passages 107 and 108. The foregoing details of the Pitot tube and the tube 103 are not intended to limit the invention since various other arrangements generally classed as Pitot tubes are capable of embodiment within the scope of the present invention.

Surrounding the tube 103 and contiguous thereto is a portion 115 of the heating element 116 which is wound helically in a close pitch in order to concentrate the heating effect thereof at a region near the leading end of the Pitot tube and for the reason heretofore explained. After locating the heating element in proper relation to the tube 103 pellets or lengths of silver solder are strategically placed between and upon the several turns of the helix 115 whereafter the outer tube 121 is placed in position and a torch applied to fuse the solder. The net result is a substantial integration of the heating element with the tubes 103 and 121 and consequent optimum heating of both the interior and exterior of that portion of the assembly comprised of the tubes 103 and 121. If desired the helix 115 may be sweated to the tube 103 prior to assembly of the tube 121.

In order to heat that portion of the assembly in the region of the passages 108 the element 116 is returned upon itself to provide axially-extending loops or convolutions 125 which are also positioned between the tubes 103 and 121 in the spaces intermediate the side outlet tubes 110. The convolutions 125 may be so arranged that more than one thereof lies intermediate each set of outlet tubes 110.

The innermost end of the element 116 is terminated as described previously in connection with FIG. 11, and the outermost end is provided with any suitable design of terminals as shown, for example, in FIG. 6.

The further alternative of FIGS. 12 to 15 incorporates some of the essential features of the two embodiments hereinbefore described. The heating element is seen best in FIG. 14 wherein the helical portion 201 thereof is tightly coiled at the leading end and also adjacent the shoulder 202 defined between the Pitot tube and its bracket. This latter is constituted as two side panels 204 of sheet metal suitably formed and paired at a mid-plane whereat the seam is brazed or welded to complete a streamline support. Zig-zag convolutions 203 of the element are arranged to lie against the interior of each side panel in a regionl adjacent the leading edge thereof. As a matter of manufacturing procedure one side of the convolutions 203 may be attached to its associated panel 204 and, prior to joining of the panels the other side may be temporarily wired to the other panel together with slugs or lengths of solder whereafter the panels are united along their seam. Subsequently heat is applied to sweat in the other side of the heating element. It will be apparent that, prior to soldering of the convolutions 203 the same may, due to the malleable character of the heating element, be deformed to conform to the curvature of the panels 204 by appropriate shaping in a die or wiring the same in place.

It will be noted that in FIGS. 6 and 12 the Pitot tube is permanently united with its support by brazing or an equivalent fusing process.

Where, herein, I refer to Pitot tubes I intend to encompass not only those consisting of a velocity tube per se but also velocity tubes combined with static pressure parts or passages and those for static pressure only.

While I have shown particular embodiments of my invention, it will be understood, of course, that I do not wish to be limited thereto since many modifications may be made and I, therefore, contemplate by the appended claims to cover any such modifications as fall within the true spirit and scope of my invention.

I claim:

1. An assembly of a Pitot tube and bracket therefor adapted to be heated to combat incipient deposition of ice comprising: an elongated tube positioned with a leading open end opposed to the direction of air flow and a trailing opposite end, a bracket secured to said tube to mount the same on an ultimate support, said bracket having a leading edge, an elongated heating element in part coiled helically contiguous to the tube and substantially integrated therewith by fusible material, the coils of the element having a closer pitch at said leading end than at said trailing end, and said element being arranged in part interiorly of the bracket in convolutions positioned adjacent the leading edge thereof, said element comprising a deformable metallic sheath enclosing an electric conductor of comparatively high resistivity to provide a temperature for the tube and bracket calculated to neutralize ice formation, and means for connecting said conductor to a source of electric current.

2. An assembly of a Pitot tube and bracket therefor adapted to be heated to combat incipient deposition of ice comprising: a tube having an open end opposed to the direction of air flow, a bracket secured to said tube, said bracket comprising a pair of side panels joined at their margins to define a hollow structure and means for securing said structure to an ultimate support, an elongated heating element comprising a deformable metal sheath enclosing an electric conductor of comparatively high resistivity to provide a temperature for the tube and bracket calculated to neutralize ice formation helically formed over a portion of its length closely embracing said tube and provided over another portion of its length with two sets of convolutions over a portion of its length, a set being contiguous to each side panel on the interior thereof and secured thereto in intimate heat-conducting relation.

3. The combination in accordance with claim 2 further characterized by a matrix of heat-fusible material surrounding said helical element portion uniting the same to said tube.

4. A Pitot tube assembly adapted to be heated to combat incipient deposition of ice comprising: an elongated inner tube positioned with a leading, open end opposed to the direction of air flow and a trailing opposite end, an elongated outer tube substantially coextensive with said inner tube and surrounding the same to define therewith an annular space at least coextensive with that portion of the common length of said tubes where at icing is to be inhibited, an electrical heating element comprising an outer metallic sheath, a conductor enclosed in said sheath and refractory material filling the voids between said conductor and sheath, said element being coiled and received in said space and being juxtaposed to the confronting wall surfaces defining said space, said wall surfaces and element being united by joints of fused metallic material providing extended contact between said element and surfaces augmenting transmission of heat from said element to said tubes, the conductor of said element having a resistivity at the voltage applied thereto to provide a temperature for said tubes calculated to neutralize formation of ice thereon, and means connecting said conductor to a source of current.

5. The combination in accordance with claim 4 further characterized in that the coils of said element have a closer pitch for a portion thereof adjacent said leading end and a coarser pitch for a portion adjacent said trailing edge and an intermediate pitch between said portions, the number of coils of each pitch being proportional to the wattage output of said element to be dissipated to the respective tube portions.

6. A Pitot tube assembly in accordance with claim 4 further characterized in that an additional elongated tube is located concentrically within said inner tube to define a second annular space therebetween, said additional tube being positioned with a leading, open end opposed to the direction or air flow and a trailing opposite end adapted to be connected to the device responsive to air flow therethrough; a plurality of radially directed, circumferentially-spaced passage means are spaced along the length of said inner and outer tubes providing fluid communication between the exterior of said outer tube and said second annular space; and said elongated heating element is provided with a plurality of generally axially directed convolutions in the region of said passage means in alternated fashion.

References Cited in the file of this patent

UNITED STATES PATENTS

| | | |
|---|---|---|
| 1,971,534 | Peace | Aug. 28, 1934 |
| 2,229,740 | Helmore | Jan. 28, 1941 |
| 2,381,327 | Woodman et al. | Aug. 7, 1945 |
| 2,404,978 | Morton | July 30, 1946 |
| 2,482,701 | Anderson | Sept. 20, 1949 |
| 2,541,512 | Hann | Feb. 13, 1951 |
| 2,703,358 | Mertler | Mar. 1, 1955 |
| 2,747,069 | Miller | May 22, 1956 |

FOREIGN PATENTS

| | | |
|---|---|---|
| 779,754 | Great Britain | July 24, 1957 |